United States Patent [19]

Omi et al.

[11] Patent Number: 4,596,373
[45] Date of Patent: Jun. 24, 1986

[54] ANTI-VIBRATION APPARATUS FOR SEISMIC ACCELERATION

[75] Inventors: Toshio Omi, Tokyo; Takafumi Fujita, Chiba; Goro Saito, Funabashi; Kozo Sakaba, Matsudo; Jiro Ishida, Kamagaya, all of Japan

[73] Assignee: Mitsubishi Steel Mfg. Co., Ltd., Tokyo, Japan

[21] Appl. No.: 439,030

[22] Filed: Nov. 4, 1982

[30] Foreign Application Priority Data

Jan. 20, 1982 [JP] Japan ................ 57-5864

[51] Int. Cl.⁴ .................................... B60N 1/08
[52] U.S. Cl. ................. 248/562; 248/588; 248/636; 248/638; 248/421
[58] Field of Search ........... 248/638, 636, 588, 580, 248/562, 419–421; 211/202, 105

[56] References Cited

U.S. PATENT DOCUMENTS

| 585,422 | 6/1897 | Boenning | 248/588 |
|---|---|---|---|
| 2,968,818 | 1/1961 | Petersen | 248/588 X |
| 3,295,800 | 1/1967 | Quarnstrom | 248/421 |
| 4,092,009 | 5/1978 | Koutsky | 248/421 |
| 4,151,973 | 5/1979 | Sedlock | 248/421 |
| 4,325,133 | 4/1982 | Reitmayer | 248/638 |
| 4,382,573 | 5/1983 | Aondetto | 248/588 X |
| 4,408,744 | 10/1983 | Thompson | 248/636 |

FOREIGN PATENT DOCUMENTS 2312390 12/1976 France ................ 248/588

Primary Examiner—Reinaldo P. Machado
Assistant Examiner—Alvin Chin-Shue
Attorney, Agent, or Firm—Amster, Rothstein & Engelberg

[57] ABSTRACT

An anti-vibration apparatus for reducing seismic acceleration is disclosed wherein X-axis direction linear motion means are horizontally displaceably mounted on X-axis direction rails installed on a foundation, and mounted on the X-axis direction linear motion means are Y-axis direction rails through Y-axis direction linear motion means or directly, and X- and Y-axis direction tension springs are disposed between the foundation and the X-axis direction rails and between the X-axis direction linear motion means and the machinery mounting platform, whereby the X- and Y-axis direction linear motion means are adapted to support transverse upward as well as downward loads together with the X- and Y-axis direction rails. The machinery mounting platform may additionally pivotally carry thereon another machinery mounting platform through articulated lever mechanisms using the former platform as a support frame.

20 Claims, 11 Drawing Figures

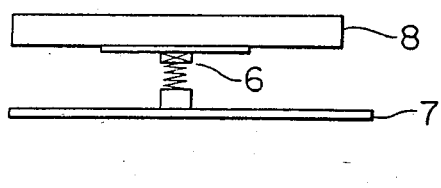
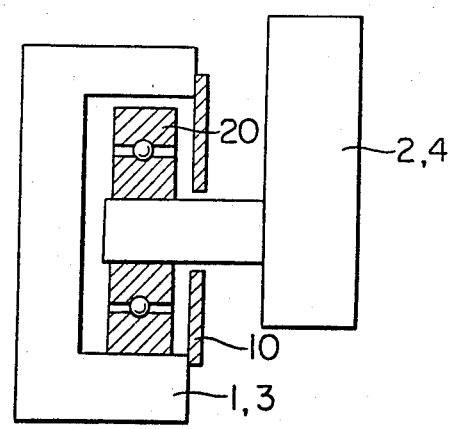
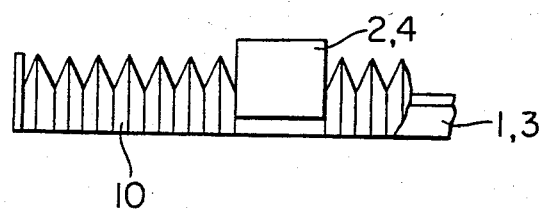
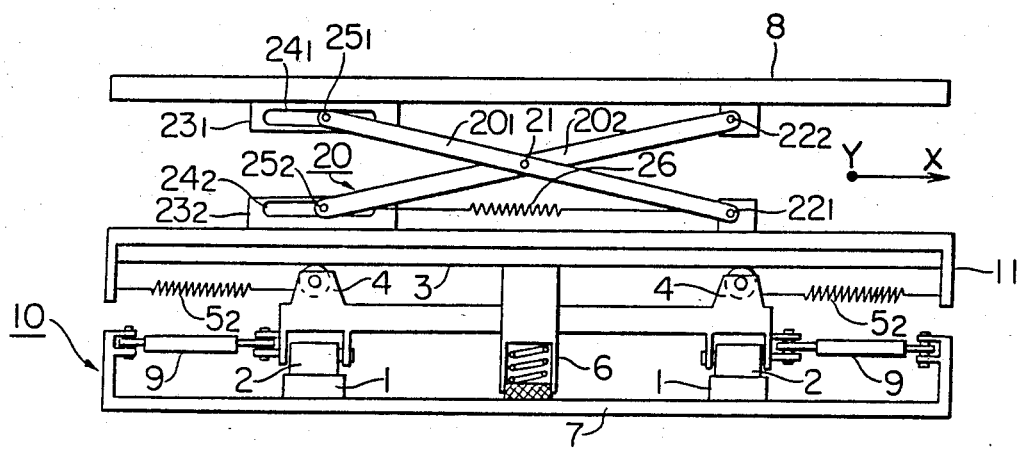
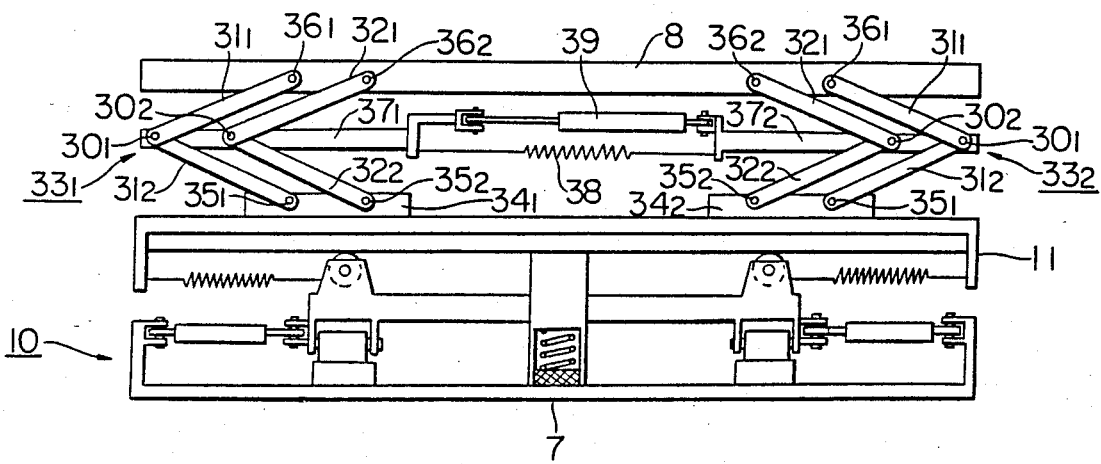

ANTI-VIBRATION APPARATUS FOR SEISMIC ACCELERATION

BACKGROUND OF THE INVENTION

The present invention relates to an anti-vibration apparatus and more particularly to an anti-vibration apparatus which can reduce seismic accelerations applied to machinery during an earthquake.

Hitherto existing anti-vibration apparatuses of this kind have been anti-vibration floors for relatively heavy building floors or various anti-vibration apparatuses for heavy objects such as tanks, but anti-vibration apparatuses for relatively light machinery are few in number.

If an anti-vibration floor for a relatively heavy building floor or an anti-vibration apparatus for heavy objects as mentioned above is used as it is as an anti-vibration apparatus for relatively light machinery, the following problems may arise:

(1) Since a conventional anti-vibration floor is large in size, it is not suitable for having a single light machine of small dimensions mounted thereon;

(2) Since in a conventional anti-vibration floor or anti-vibration apparatus no precaution against upset or rocking of machinery is taken into consideration, they are not adapted to support light machinery which is apt to be upset or rocked during an earthquake; and (3) Since anti-vibration apparatuses are subjected to a rotational movement during an earthquake they are not adequate to suppress the vibration of long machinery.

SUMMARY OF THE INVENTION

It is a principal object of the present invention to provide an anti-vibration apparatus for reducuing seismic acceleration which is suitable for use in lighter machinery and can obviate the above-mentioned problems which may occur when a conventional anti-vibration floor or anti-vibration apparatus for heavy machinery is applied thereto.

It is another object of the present invention to provide an anti-vibration apparatus for reducing seismic acceleration which is low in height.

It is a further object of the present invention to provide an anti-vibration apparatus for reducing seismic acceleration wherein springs of a linear oscillation system are used so that the theoretical analysis of the apparatus is made easy.

It is a still further object of the present invention to provide an anti-vibration apparatus for reducing seismic acceleration wherein easy restoration to its original state is assured after the earthquake has ceased.

It is an object of the present invention to provide an anti-vibration apparatus for reducing seismic acceleration which allows machinery to be mounted directly thereon.

It is a further object of the present invention to provide an anti-vibration apparatus for reducing seismic acceleration which can reduce seismic acceleration not only in the horizonal direction, but also in the vertical direction.

In accordance with the present invention an anti-vibration apparatus for reducing seismic acceleration is provided wherein X-axis direction rails are installed horizontally on a foundation, X-axis direction linear motion means which can support transverse upward as well as downward loads applied thereto being mounted on the X-axis direction rails, and Y-axis direction rails being arranged on the X-axis direction linear motion means directly or through the Y-axis direction linear motion means which can support transverse upward as well as downward loads, and a machinery mounting platform is arranged horizontally on the Y-axis rails through similar Y-axis direction linear motion means or directly, whereby spring means are disposed between the foundation and the linear motion means as well as between the linear motion means and the machinery mounting platform such that the spring means operate in the X-direction and Y-direction, and damper means may be disposed between the rails and the linear motion means.

In accordance with one form of the present invention, an additional machinery mounting platform is arranged horizontally above the machinery mounting platform with an articulated lever mechanism being interposed therebetween so as to pivotally and horzontally support the additional machinery mounting platform relative to the machinery mounting platform which now acts as support frame.

This apparatus can reduce seismic acceleration not only in the horizontal direction, but also in the vertical direction when it is associated with spring and also damper means, if necessary, although the first mentioned apparatus can reduce seismic acceleration solely in the horizontal direction.

BRIEF DESCRIPTION OF THE DRAWINGS

These and other objects of the present invention will become more readily apparent upon reading the following specification and upon referring to the accompanying drawings, in which:

FIG. 5 is a diagrammatic view showing an example wherein a friction damper is disposed between the machinery mounting platform and the foundation;

FIG. 6 is a diagrammatic view of an example wherein a dust shield is installed between the linear motion means to cover the rail;

FIG. 7 is a partial sectional view of another embodiment of the present invention in which the linear motion means are secured to the rails by bearings;

FIG. 8 is a are side elevational view of a further embodiment of the present invention which reduces seismic acceleration in the vertical direction as well as in the horizontal direction;

FIG. 9 is a side elevational view of an embodiment of the invention similar to that of FIG. 8 and employing an articulated lever mechanism which differs from that of FIG. 8;

DESCRIPTION OF THE PREFERRED EMBODIMENTS

Figure 1:
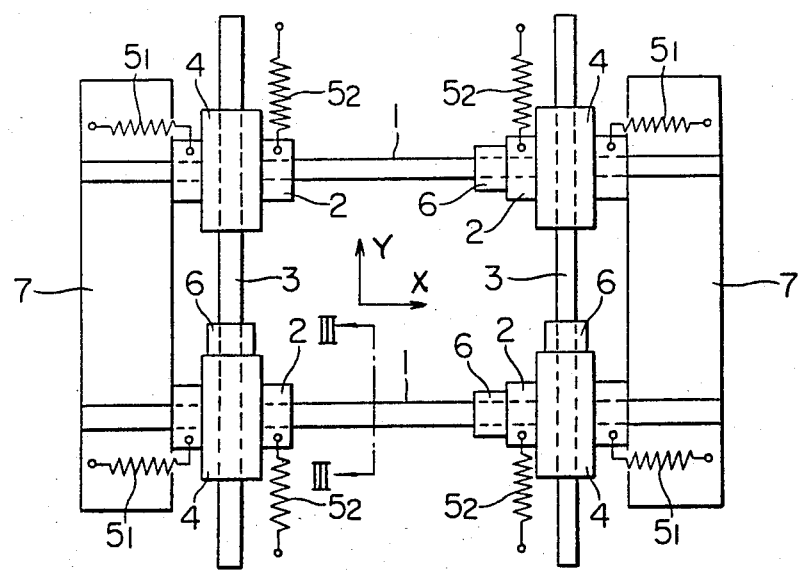
FIG. 1 is a schematic plan view of an embodiment of the present invention with the machinery mounting platform being removed for the sake of clarity.
Figure 2:
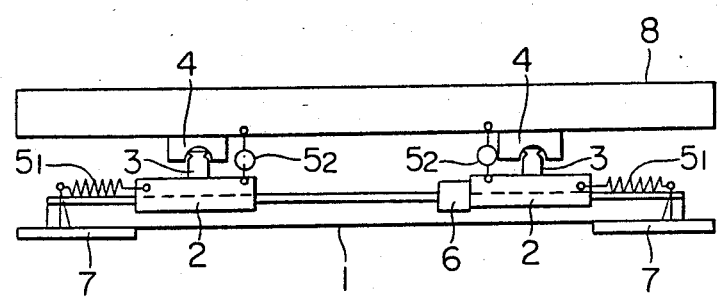
FIG. 2 is a side elevational view of the embodiment shown in FIG. 1.

Referring now to FIGS. 1 and 2 of the drawings wherein a first embodiment of the present invention is schematically represented the reference numerals represent the following elements:

1: an X-axis direction rail; 2: an X-axis direction linear motion means; 3: a Y-axis direction rail; 4: a Y-axis direction linear motion means; $5_1$, $5_2$: a tension spring; 6: a friction damper; 7: a base; and 8: a machinery mounting platform.

A more detailed explanation of the embodiment comprising the above elements will be given below.

Figure 3:
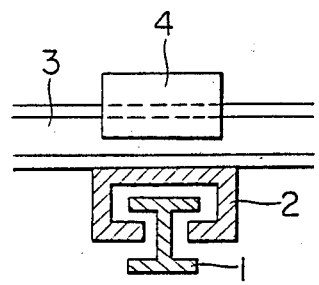
FIG. 3 is a cross sectional view of a portion of the embodiment shown in FIG. 1 taken along the line III—III of FIG. 1.

A pair of X-axis direction rails 1 are secured on a pair of bases 7 so as to be parallel with each other, whereby the X-axis direction rails are adapted to be installed horizontally on a floor or a foundation through bases 7. Displaceably mounted on each of rails 1 are a pair of X-axis direction linear motion means 2 spaced at intervals which can support transverse upward as well as downward loads due to the fact that the bottom of the hollow cross-sectioned embraces touch the head of rail 1. See FIGS. 3 and 4. A pair of horizontal Y-axis direction rails 3 are secured to adjoining linear motion means 2 disposed on X-axis direction rails 1 so as to confront each other and be orthogonal to the X-axis direction rails 1. A pair of linear motion means 4 is arranged on each Y-axis direction rail 3 as shown in FIG. 3, and a machinery mounting platform 8 is horizontally secured to Y-axis direction linear motion means 4.

Figure 4:
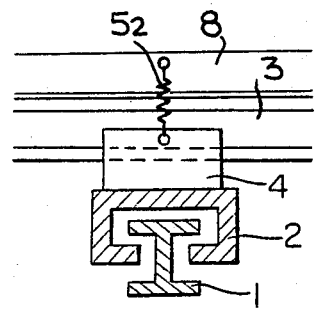
FIG. 4 is a similar view to FIG. 3 showing a modification of the embodiment of FIG. 3 in which the Y-axis linear motion means is secured to the X-axis linear motion means.

Alternatively, as shown in FIG. 4 Y-axis direction linear motion means 4 may be secured to X-axis direction linear motion means 2, Y-axis direction rails 3 being mounted to Y-axis direction linear motion means 4, and machinery mounting platform 8 may be directly secured to Y-axis direction rails 3. Thus, it will be appreciated that machinery mounting platform 8 constitutes a horizontal table in the X-Y plane that can be freely displaced horizontally in any direction when it is subjected to an earthquake. Machinery mounting platform 8 is also prevented from upsetting or rocking by X- and Y-axis direction rails 1, 3 together with X- and Y-axis direction linear motion means 2 and 4, because linear motion means 2, 4 can support transverse upward as well as downward loads for the reasons described above.

Further, in the present apparatus, as shown in FIGS. 1 and 2, four tension springs $5_1$ are disposed in the X-direction such that each of them is secured at one end to X-axis direction linear motion means 2, respectively, and at the other end to base 7, and four tension spring $5_2$ are disposed in the Y-direction such that each of them is secured at one end to X-axis direction linear motion means 2, and at the other end to machinery mounting platform 8. In the alternate embodiment of FIG. 4, the tension springs $5_2$ are connected between the Y-axis direction linear motion means 4 and the machinery mounting platform 8. With that they being so disposed tension springs $5_1$ and $5_2$ always operate only in the X-direction and the Y-direction, respectively, regardless of the direction of movement of machinery mounting platform 8. Therefore, the present apparatus is a linear oscillation system. Also, as shown in FIGS. 1 and 2, friction dampers 6 can be disposed between X- and Y-axis direction rails 1, 3 and X- and Y-axis direction linear motion means 2, 4, or between X- and Y-axis direction rails 1, 3 and machinery mounting platform 8 (not shown), or between bases 7 and machinery mounting platform 8 as shown in FIG. 5 so as to operate therebetween. Friction dampers 6 can reduce the relative displacement between the floor or the foundation and machinery mounting platform 8 at the time of an earthquake, and at the same time make it possible for the height of the apparatus to be low. Further, the residual displacement of the machinery mounting plate 8 at the time of the termination of an earthquake is made zero by removing the friction force of friction dampers 6 so that machinery mounting platform 8 can be restored to its original position.

As shown in FIG. 6, if a collapsible dust shield 10 such as a shield in the form of a bellows made of any suitable material is disposed between aligned linear motion means 2 or 4 so as to cover X-axis direction rail 1 or Y-axis direction rail 3, dust is prevented from accumulating on the rails and at the same time it is possible to make shield 10 act as a stopper to limit excessive displacement of the linear motion means. The provision of dust shield 10 to prevent dust accumulation on the rails is important in that it increases the reliability of the apparatus.

X- and Y-axis direction rails 1, 3 as well as linear motion means 2, 4 may have any configuration that can support transverse upward as well as downward loads.

In the above embodiment, although friction dampers 6 are described as being disposed between X- and Y-axis rails 1, 3 and linear motion means 2, 4, etc. it is also possible to use oil dampers, magnetic dampers, air dampers, or the like in place of friction dampers 6. When oil dampers or air dampers are used in parallel with tension springs $5_1$, $5_2$ so as to operate in one direction, the height of the apparatus can be made lower.

FIG. 7 shows a modified embodiment of the present invention wherein X- or Y-axis direction rail 1 or 3, linear motion means 2 or 4, and dust shield 10 have different constructions than in the previous embodiments described above, whereby the reference numeral 20 indicates a bearing mounted to linear motion means 2 or 4 so as to displaceably support them on rails 1 or 3 such that transverse upward as well as downward loads are supported by the rails.

Since in the present invention machinery mounting platform 8 is arranged on the foundation so as to be freely horizontally displaceable in the X- and Y-axis directions through X- and Y-axis direction rails 1, 3 and X- and Y-axis direction linear motion means 2, 4, upon occurrence of an earthquake, machinery mounting platform 8 can be kept substantially at a standstill by means of rails 1, 3, linear motion means 2, 4, tension spring $5_1$, $5_2$, friction dampers 6, etc., whereby the seismic acceleration applied to relatively light machinery set on platform 8 can be considerably reduced.

The effects of the present invention which has the construction as described above and operates as described above can be summarized as follows:

(1) Since linear motion means 2, 4 can support transverse upward as well as downward loads, even when machinery whose center of gravity is high is set on machinery mounting platform 8, there is no fear of its overturning, and rocking is prevented at the time of an earthquake;

(2) Due to the arrangement of X-and Y-axis direction rails 1, 3, no rotational motion of machinery mounting platform 8 is generated at the time of an earthquake and therefore machinery which is relatively long in the transverse direction can be easily refrained from oscillating;

(3) Since linear motion means 2, 4 can have their coefficients of friction relative to X- and Y-axis direction rails 1, 3 made low, a superior anti-vibration effect can be produced; and (4) By removing the frictional force of friction damper 6 machinery mounting platform 8 can be easily restored to its original position after the termination of an earthquake.

Although the above embodiments are intended to reduce seismic accelerations only in the horizontal direction other embodiments of the present invention which are intended to reduce seismic accelerations not only in the horizontal direction, but also in the vertical direction will be now explained with reference to FIGS. 8 to 11.

First, in FIG. 8 there is shown a first embodiment of this kind wherein the basic construction of the apparatus shown in FIGS. 1 and 2 is represented by the reference numeral 10 with generally the same reference numerals being used in FIGS. 1, 2, and 8 except for reference numeral 8. In FIG. 8, the element corresponding to machinery mounting platform 8 of FIGS. 1 and 2 bears the reference numeral 11, and this element 11 is hereinafter referred to as a support frame. Further, in this embodiment and in the ones to be described later, it is assumed that machinery mounting platform 8 and support frame 11 have a similar rectangular configuration in plan view.

As can be seen in FIG. 8, although the basic construction 10 does not strictly coincide with the apparatus shown in FIGS. 1 and 2, there is only a slight difference between them and it will be readily understood that basic construction 10 operates in a manner entirely similar to the apparatus shown in FIGS. 1 and 2.

In the embodiment shown in FIG. 8 machinery mounting platform 8 is mounted on support frame 11 through articulated lever mechanisms 20 each comprising levers $20_1$ and $20_2$. That is, articulated lever mechanism 20 comprises a pair of levers $20_1$ and $20_2$ which intersect at substantially their mid portions to be pivotally connected together by a pivot pin 21, and one of the levers $20_1$ is at its lower end portion pivoted about support frame 11 by a pivot pin $22_1$ and at its upper end portion carried by a bracket $23_1$ secured to the under surface of machinery mounting platform 8 so as to be horizontally shiftable within a slot $24_1$ formed in bracket $23_1$ by a pin $25_1$ secured to lever $20_1$, while the other lever $20_2$ is at its lower end portion carried by a bracket $23_2$ secured to support frame 11 so as to be horizontally shiftable within a slot $24_2$ formed in bracket $23_2$ by a pin $25_2$ and at its upper end portion pivoted to machinery mounting platform 8 on its under surface by a pin $22_2$. Levers $20_1$ and $20_2$ are connected together near their lower end portions by a tension spring 26 disposed in parallel with support frame 11.

Thus, in this embodiment, when input is applied to it by an earthquake, the horizontal seismic acceleration applied to machinery mounting platform 8 can be reduced by X-axis direction linear motion means 2 and Y-axis direction linear motion means 4, and the vertical seismic acceleration can be reduced by articulated lever mechanisms 20 and tension spring 26. In this case, machinery mounting platform 8 is always kept horizontal owing to the action of articulated lever mechanisms 20 so that the machinery installed on platform 8 which is to be prevented from vibrating can be horizontally supported in a substantially stationary condition.

FIG. 9 shows another embodiment wherein machinery mounting platform 8 is supported on support frame 11 by two sets of link mechanisms $33_1$ and $33_2$, each set being disposed at one of the ends of the longitudinal axis of support frame 11. More particularly, link mechanisms $33_1$ and $33_2$ each comprises two levers $31_1$ and $31_2$ each of which is pivotally connected at one end by a pivot pin $30_1$, and two levers $32_1$ and $32_2$ each of which is pivotally connected at one end by a pivot pin $30_2$, whereby the lower ends of levers $31_2$ and $32_2$ of the respective sets are pivotally connected to a bracket $34_1$ and a bracket $34_2$ which are secured to opposite ends of support frame 11 by pivot pins $35_1$ and $35_2$, the upper ends of levers $31_1$ and $32_1$ of the respective sets being pivotally connected to the longitudinal side of machinery mounting platform 8 at opposite end portions by pivot pins $36_1$, $36_2$. In this case, pivot pins $30_1$, $30_2$ pivotally connecting levers $31_1$, $31_2$ and $32_1$, $32_2$ constituting the other set of link mechanism $33_2$ are directed outwards relative to the center of support frame 11 in the longitudinal direction so as to be separated from each other.

Further, in the embodiment shown, the two sets of pivot pins $30_1$, $30_2$ thus arranged so as to be separated apart are pivotally connected together by short connecting rods $37_1$, $37_2$, respectively, the confronting ends of connecting rods $37_1$, $37_2$ being connected together by a tension spring 38 and an oil damper 39 disposed in parallel with each other.

Thus, in this embodiment, machinery mounting platform 8 is mounted on support frame 11 by articulated lever mechanisms each comrpising two sets of link mechanisms $33_1$, $33_2$ with tension spring 38 and oil damper 39 connecting them. Therefore, upon application of seismic acceleration, machinery mounting platform 8 behaves in a manner entirely similar to the embodiment shown in FIG. 8, and in the embodiment shown in FIG. 9 the vertical seismic acceleration can be damped by oil damper 39.

Figure 10:
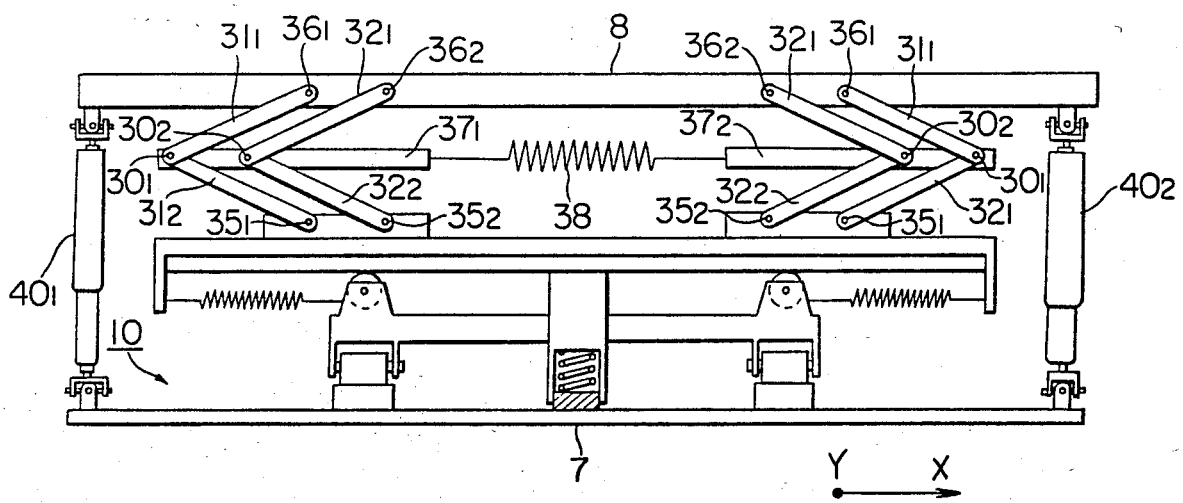
FIG. 10 is a side elevational view of an embodiment of the invention similar to that of FIG. 9 and employing a vertical damping means which differs from that of FIG. 9.

FIG. 10 shows a modification of the embodiment of FIG. 9 wherein oil damper 9 shown in FIG. 9 as connecting short connecting rods $37_1$, $37_2$ is eliminated, and instead vertical oil dampers $40_1$ and $40_2$ are provided to pivotally connect machinery mounting platform 8 and foundation 7 at opposite ends of the longitudinal axis of platform 8.

It will be easily understandable that this embodiment operates in a manner quite similar to the one shown in FIG. 9 so that vertical seismic accelerations can be effectively reduced with a damping effect being accompanied by oil dampers $40_1$, $40_2$.

Figure 11:
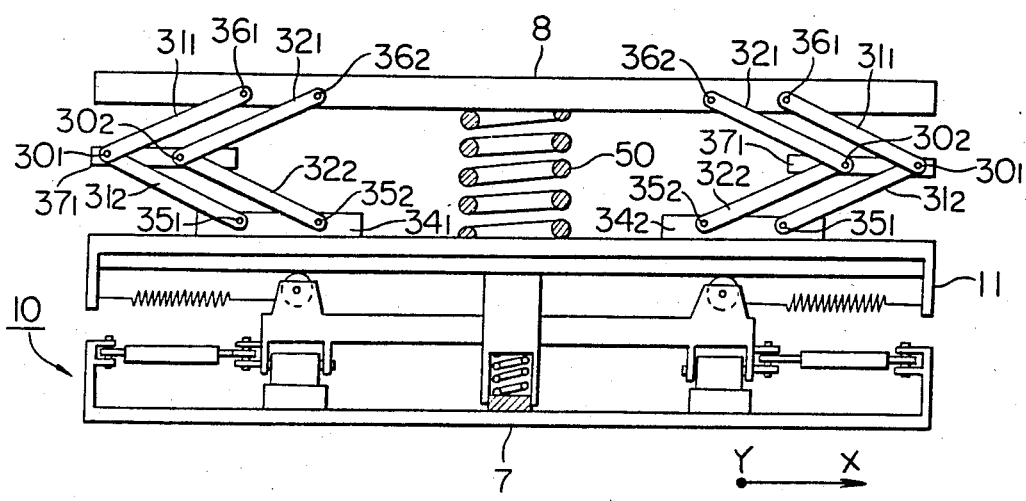
FIG. 11 is a side elevational view of an embodiment of the invention similar to that of FIG. 9 and employing a vertical damping means which also differs from that of FIG. 9.

Finally FIG. 11 shows a still further embodiment of the present invention wherein, in place of tension spring 38 and oil damper 39 connecting short connecting rods $37_1$, $37_2$ shown in FIG. 9, a compression spring 50 is disposed between machinery mounting platform 8 and support frame 11 in their central portions.

Also in this embodiment it will be clear that machinery mounting platform 8 can effectively reduce vertical seismic accelerations owing to the operation of compression spring 50.

From the foregoing it will be appreciated that the embodiments described and shown in FIGS. 8 to 11 produce the following effects in addition to the effects (1) to (4) described above in connection with the embodiments shown in FIGS. 1 to 7:

(5) The machinery mounting platform can reduce also the vertical seismic acceleration when the apparatus is subjected to an earthquake;

(6) Notwithstanding the vertical seismic acceleration the machinery installed on the machinery mounting platform can always be kept horizontal; and (7) The machinery installed on the platform can be prevented from being rocked or yawed.

While several preferred embodiments of the present invention have been described and illustrated above it will be understood that modification may be made thereto without departing from the spirit of the present invention.

What is claimed is:

1. An anti-vibration apparatus for reducing seismic acceleration comprising at least two parallel X-axis direction rails horizontally installed on a foundation, at least two X-axis direction linear motion means displaceably mounted on each of said X-axis direction rails, at least two Y-axis direction linear motion means, at least two parallel Y-axis direction rails each relatively displaceably coupled to said X-axis direction rails, the X-axis direction rails and the Y-axis direction rails being disposed in different planes, a machinery mounting platform relatively displaceably coupled to said Y-axis direction rails, an X-axis direction tension spring disposed between said foundation and each of at least two X-axis direction linear motion means mounted on an X-axis direction rail, and a Y-axis direction tension spring coupled between each of at least two X-axis direction linear motion means mounted on an X-axis direction rail and said machinery mounting platform.

2. An anti-vibration apparatus for reducing seismic acceleration as claimed in claim 1 wherein each of said linear motion means is of the type which can support transverse upward as well as downward loads.

3. An anti-vibration apparatus for reducing seismic acceleration as claimed in claim 1 wherein dust shield means are disposed on each of said rails extending between said linear motion means.

4. An anti-vibration apparatus for reducing seismic acceleration as claimed in claim 1 wherein the Y-axis direction rails are displaceably coupled to said X-axis direction rails through said X-axis direction linear motion means.

5. An anti-vibration apparatus for reducing seismic acceleration as claimed in claim 1 wherein said Y-axis direction rails are displaceably coupled to said X-axis direction rails through said X-axis direction linear motion means and said Y-axis direction linear motion means.

6. An anti-vibration apparatus for reducing seismic acceleration as claimed in claim 1 wherein said machinery mounting paltform is connected directly to said Y-axis direction rails, and said Y-axis direction tension springs are connected between said machinery mounting platform and said Y-axis direction linear motion means.

7. An anti-vibration apparatus for reducing seismic acceleration as claimed in claim 1 wherein said machinery mounting platform is coupled to said Y-axis direction rails through and is connected directly to said Y-axis linear motion means, and said Y-axis direction tension springs are connected between said machinery mounting platform and said X-axis direction linear motion means.

8. An anti-vibration apparatus for reducing seismic acceleration as claimed in claim 1 wherein disposed between said foundation and said machinery mounting platform are at least one damping means.

9. An anti-vibration apparatus for reducing seismic acceleration as claimed in claim 1 wherein disposed between said X-axis direction rails and said X-axis direction linear motion means as well as between said Y-axis direction rails and said Y-axis direction linear motion means are at least one damping means.

10. An anti-vibration apparatus for reducing seismic acceleration as claimed in claim 9 wherein said damping means are a friction damper, oil damper, magnetic damper, air damper or the like.

11. An anti-vibration apparatus for reducing seismic acceleration as claimed in claim 9 wherein said damping means are disposed normal to the direction of relative movement of said linear motion means and said rails.

12. An anti-vibration apparatus for reducing seismic acceleration as claimed in claim 9 wherein disposed between said foundation and said machinery mounting platform are at least one further damping means.

13. An anti-vibration apparatus for reducing seismic acceleration as claimed in claim 1 including a further machinery mounting platform and an articulated lever mechanism connecting the further machinery mounting platform and the machinery mounting platform, the machinery mounting platform serving as a support frame and supporting the further machinery mounting platform in a horizontal plane through the articulated lever mechanism.

14. An anti-vibration apparatus for reducing seismic acceleration as claimed in claim 13 wherein said further machinery mounting platform and said support frame have similar rectangular configurations in plan view.

15. An anti-vibration apparatus for reducing seismic acceleration as claimed in claim 14 wherein said articulated lever mechanism comprise two pairs of levers disposed along the confronting longer sides of said further machinery mounting platform and said support frame, each pair consisting of two levers pivotally connected together at their mid portions, and one lever of each pair of levers is pivotally connected at its lower end to said support frame and slidably connected at its upper end to the under face of said further machinery mounting platform, while the other lever of each pair is slidably connected at its lower end to said support frame and pivotally connected at its upper end to said under face of said further machinery mounting platform.

16. An anti-vibration apparatus for reducing seismic acceleration as claimed in claim 14 wherein said articulated lever mechanism comprises two pairs of links disposed along each of the confronting longer sides of said further machinery mounting platform and said support frame at the end portion, with each link of said pairs of links comprising two levers pivotally connected together at their common ends with the other ends being pivotally connected to said further machinery mounting platform and said support frame, respectively, whereby said levers comprising said pairs of links are disposed in parallel with each other with said pivotally connected ends being connected together by a short connecting rod, and compression spring means disposed between said further machinery mounted platform and said support frame.

17. An anti-vibration apparatus for reducing acceleration as claimed in claim 14 wherein said articulated lever mechanism comprise two pairs of links disposed along each of the confronting longer sides of said further machinery mounting platform and said support frame at their end portions, with each link of said pairs of links comprising two levers pivotally connected together at their common ends with the other ends being pivotally connected to said further machinery mounting platform and said support frame, respectively, whereby said levers comprising said pairs of links are disposed in parallel with each other with said pivotally connected ends being connected together by a short connecting rod, and said short connecting rods belonging to said separate pairs of links are connected together by an elastic means.

18. An anti-vibration apparatus for reducing seismic acceleration as claimed in claim 17 wherein said elastic means is a tension spring.

19. An anti-vibration apparatus for reducing seismic acceleration as claimed in claim 17 wherein an oil damper means is disposed in parallel with said elastic means.

20. An anti-vibration apparatus for reducing seismic acceleration as claimed in claim 17 wherein at least two oil damper means are disposed between said machinery mounting platform and said foundation one at each longitudinal end of said machinery mounting platform.

* * * * *